United States Patent [19]

Boutin

[11] Patent Number: 5,343,753

[45] Date of Patent: Sep. 6, 1994

[54] DEVICE FOR DETECTING A VARIATION IN A PRESSURE BEING MONITORED BY SENSING DISPLACEMENT OF A BALL IN A TUBE

[75] Inventor: Guy Boutin, Villeneuve les Avignon, France

[73] Assignee: Societe Civile d'Etudes et de Recherches Revo'Reg, Cavaillon, France

[21] Appl. No.: 969,271

[22] PCT Filed: Jul. 18, 1991

[86] PCT No.: PCT/FR91/00592

§ 371 Date: Jan. 15, 1993

§ 102(e) Date: Jan. 15, 1993

[87] PCT Pub. No.: WO92/01917

PCT Pub. Date: Feb. 6, 1992

[30] Foreign Application Priority Data

Jul. 19, 1990 [FR] France .................. 90 09226

[51] Int. Cl.⁵ .............................. G01L 7/00
[52] U.S. Cl. ........................ 73/701; 73/705; 73/751; 73/729.1
[58] Field of Search .............. 73/299, 302, 38, 751, 73/715, 146.2, 729, 701, 714, 729.1, 729.2; 340/626, 607

[56] References Cited

U.S. PATENT DOCUMENTS

| | | | |
|---|---|---|---|
| 2,403,897 | 7/1946 | Aller | 73/40 |
| 3,914,995 | 10/1975 | Yoshida | 73/38 X |
| 4,583,484 | 4/1986 | Freund | 116/268 |
| 5,056,513 | 10/1991 | Boutin | |

FOREIGN PATENT DOCUMENTS 3618230 12/1987 Fed. Rep. of Germany.

OTHER PUBLICATIONS

Patent Abstracts of Japan, vol. 1, No. 58, 6 Jun. 1977, p. 119E77, & JP,A, 52/2457 (Sankyo Kogyo K.K.) 1 Oct. 1977.

*Primary Examiner*—Richard E. Chilcot, Jr.
*Assistant Examiner*—Joseph L. Felber
*Attorney, Agent, or Firm*—Dvorak and Traub

[57] ABSTRACT

A detector tube is supplied with air at an adjustable pressure balanced by at least two adjustable leak flow rates in the conduits 4 and 7 in order to adjust the position of ball in the tube. The possible manual inclination of tube between an extreme vertical position and position slightly inclined to the horizontal is a complementary means of adjustment. The detector tube can be used for the detection and measurement of micropressures and micro flow rates.

15 Claims, 3 Drawing Sheets

DEVICE FOR DETECTING A VARIATION IN A PRESSURE BEING MONITORED BY SENSING DISPLACEMENT OF A BALL IN A TUBE

BACKGROUND OF THE INVENTION

1. Field of the Invention

The invention relates to a device for detecting and transmitting a pneumatic micro signal for emission of analog or digital signal, more precisely for the transmission of signals generated by pressure or differential pressure or depression transmitters.

2. Description of the Prior Art

Pressure or depression detectors employing air microwave are known, which use a tube of small dimensions containing a small mobile ball capable of moving in the tube under the action of a pressure or a depression applied to one or the other of its ends. The movement of the ball is detected by one or more detectors which furnish an analog or digital signal reflecting the air micro-wave emitted. The extreme sensitivity of this type of detector, and the fact that it necessitates only a very low consumption of air, renders it adapted for use in a zone remote from a source of electrical energy. However, the supply of air, however small it is, must be very finely adjusted for the detector in question to be able to be used under the best conditions possible and in particular applications.

It is one of the merits of the Applicants to have precisely imagined a particular assembly of the air microwave ball detector, allowing the conversion of a collected micro signal into an analog or digital opto-electronic signal.

SUMMARY OF THE INVENTION

The invention thus has for its object a device for detecting and transmitting a pneumatic micro signal for emission of an analog or digital signal using an air micro-wave detector tube containing a displaceable ball, whose reciprocating movement is detected and transmitted by a detection unit using a plurality of optical fibers, said tube collecting the pressure and/or depression variations to be monitored, device according to which the detector tube is supplied with air at an adjustable pressure which is balanced by at least two adjustable leak flowrates, at least one on a conduit upstream of the tube and the other on a conduit downstream, in order to adjust the position of the path of the ball in the tube, a complementary means for adjusting the position of the ball being ensured by the manual inclination of the tube between an extreme vertical position and a position slightly inclined with respect to the horizontal.

According to another characteristic of the invention, the tube is integrated in a box constituting the module for converting a modulated pneumatic signal of 3 to 15 PSI, into modulated micro signal, and able to emit an analog or digital signal transmitted by the optical fibers, or the tube is integrated in a box constituting the transmission module of micro-pressures and of micro air flowrates with analog or digital output transmitted by the optical fibers, a source of air pressure being admitted to the box which presents a precision regulator flowmeter.

According to another particular characteristic of the invention, two U-tubes terminated in two small compartments filled with water serve as interface between a taking of measurement and the transmission module, measurement-taking being ensured at two points of a conduit each connected to the closed head of a compartment, each other compartment being connected to the module by a bubbling tube immersed in the corresponding compartment communicating with the free air via an orifice.

Other particular characteristics, the advantages and preferred applications will appear on reading the following description, reference being made to the accompanying drawings.

DESCRIPTION OF THE PREFERRED EMBODIMENTS

Figure 1:
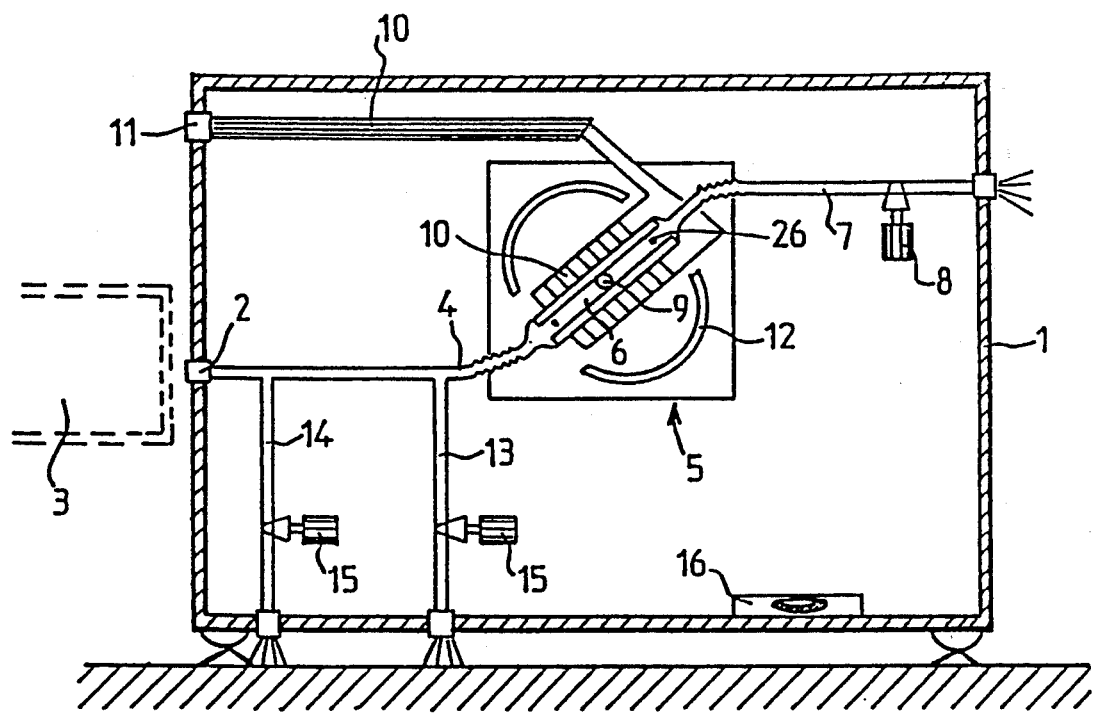
FIGS. 1 and 2, schematic views in elevation of boxes constituting the converter and transmission modules of the device.

FIG. 1 shows an essential element of the device for detecting and transmitting a pneumatic micro signal which is a module for converting a modulated pneumatic signal of 3 to 15 PSI into modulated micro signal, and emission of analog or digital signal, transmitted by optical fibers. It is in the form of a box or case 1 to which may be connected, by a connection 2 for supply, the output 3, 15 PSI of a conventional pneumatic transmitter 3 shown in broken lines. The connection 2 establishes a pressure (of 3 to 15 PSI issuing from the transmitter) at a distribution conduit 4 towards an air microwave detector generally designated by a reference 5. The latter is constituted by a small glass tube 6 connected at one of its ends to the conduit 4 and at the other end to a leak conduit 7 in which flow can be adjusted by a microvalve or by a needle valve tap or by a calibrated orifice 8. The length of the glass tube 6 is determined as a function of the desired sensitivity. A double layer 10 of emitting and receiving optical fibers, terminating in the wall of the case by a connection 11, is aligned on either side of the tube 6 containing a small ball 9. Connection of the conduits 4 and 7 to the tube 6 is effected by flexible sections to allow the tube 6 to rotate with the plate 12 which supports the assembly, about a horizontal axis. The detector may thus be manoeuvred manually to give the tube the desired inclination between a vertical position and a position close to the horizontal. The air pressure in the conduit 4 is therefore balanced by the adjustable leak conduit 7 downstream of the detector, but also by an adjustable leak conduit 13 upstream, possibly completed by a complementary adjustable leak conduit 14 and adjacent the preceding one, each equipped with a microvalve for adjustment or a needle valve tap 15. Finally, a level 16 makes it possible to adjust the horizontability of the case. The inner diameter of the glass tube 6 is strictly cylindrical to make it possible to obtain maximum sensitivity in the detection of the micro pressures or micro flowrates; a light ball 9, advantageously made of plastics material, fitted with minimum clearance, moves in the tube; its path is limited by two small stops 26, pierced and notched to allow the air to pass, placed on either side of the path of the ball. In certain particular cases of use, the tube is not strictly cylindrical but may present a profile slightly conical from bottom to top, to obtain a more extensive scale of measurement than with the cylindrical tube.

Figure 6:
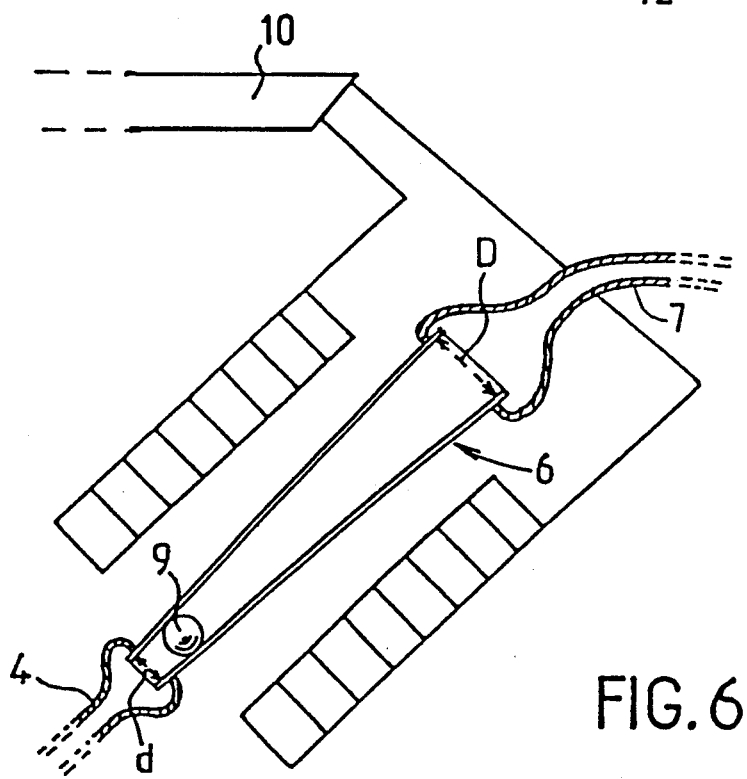
FIG. 6, a view on a larger scale of the detector tube.

FIG. 6 shows an enlarged view of the detector assembly using such a conical tube 6, of which the base diameter d is smaller than the upper diameter D and whose length is determined accordingly.

In addition, different possibilities of adjustment and calibration are offered by the device, as determined by the length of the glass tube and its conicity, as well as the weight and diameter of the ball and its clearance in the tube.

Adjustment of the leak flowrates in question as well as adjustment of the inclination of the tube 6 make it possible, for a variable flowrate, as the user chooses, to adjust the sensitivity of the detector and the immobilization of the ball in the tube, for example at its center.

Figure 2:
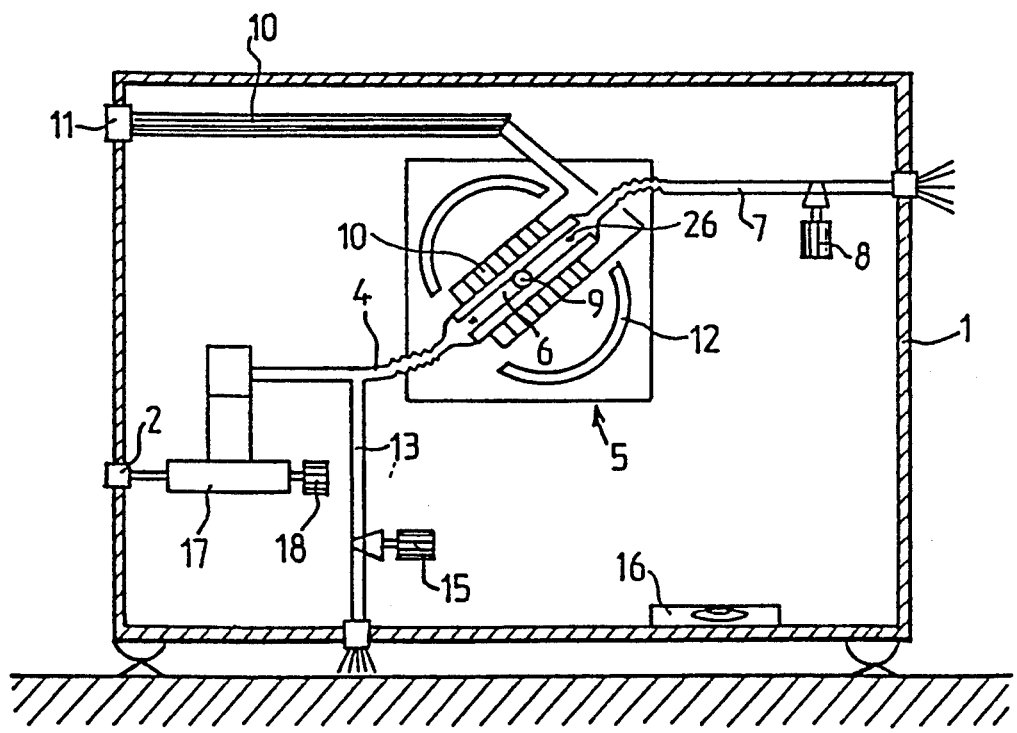
Figure 3:
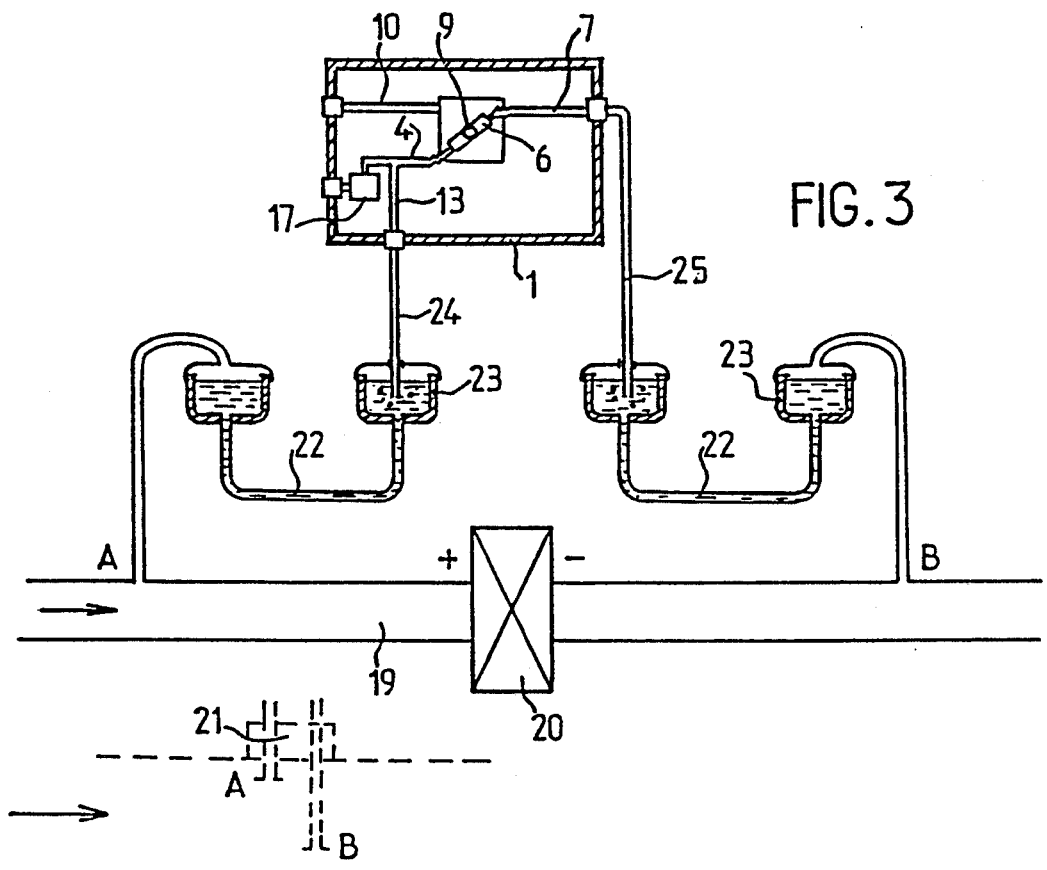
FIG. 3, a schematic view of a measurement interface constituted by U-tubes.

A variant embodiment of the case is illustrated in FIG. 2 which shows a transmission module in which the same elements present the same references. However, the air supply (3 to 15 PSI) is replaced by a source of air pressure at the level of the connection 2. A precision regulator flowmeter 17 is integrated with the conduit 4 and adjustable by a needle valve tap 18. The outlet conduit 7 allows the connection of the case to an appropriate source of pressure or lack of pressure as will now appear in particular with reference to FIG. 3 in which the case is used with a view for detecting a difference in pressure at two points of a tube 19 for circulation of fluid, particularly air. In the present case, it is question of detecting the clogging of a filter 20 located on the tube 19 by making a pressure prick at two points A and B respectively upstream and downstream of said filter. Or as shown in broken lines, the flowrate is measured at two points A and B on a depression-creating member 21. In either case, two U-tubes are used, designated by reference 22 terminated by two small compartments filled with liquid designated by reference 23. Prick points A and B are each connected to the closed head of one of the compartments of each U-tube. The other compartment on prick point A side is connected to the leak conduit 13 of module 1, via a bubbling tube 24 immersed in said compartment, whilst the other compartment on prick point B side is connected to the outlet conduit 7, via another bubbling tube 25 immersed in said compartment comprising an orifice for communication with the free air. In this way, the compartments 23 serve as interface between the measurement taking and the transmission module.

The device functions as follows:

At the beginning, the user regulates the leak flowrate of the air emitted by the regulator 17 in the conduit 4 due to the bubbling tubes (24, 25) by immersing them more or less in the liquid of the compartments. In this way, the pressure of liquid being established at the opening of the tubes influences the flowrate of the air bubbles coming from conduits 13 and 7 in slight excess pressure. When the equilibrium of the ball 9 in the middle of the tube 6 is obtained, the apparatus is ready to operate. If no difference in pressure exists between A and B, the levels of liquid are balanced in each pair of the compartments 23 and the bubbling continues to be effected normally, the ball 9 remaining in equilibrium. If a difference in pressure appears between the two points, for example further to the clogging of the filter 20, and if the pressure at B is reduced with respect to A, this pressure reduction will be exerted in the corresponding compartment 23 causing a rise of liquid, and consequently of the descent of liquid in the adjacent compartment. When the height of liquid above the orifice of the bubbling tube 25 decreases, the resultant drop in pressure will promote bubbling and consequently increase the flowrate of bubbled air; the ball 9 will therefore move upwardly in its tube, proportionally to the difference in pressure, and will therefore be detected by the opto-electronic system.

The process is completed by an inverse phenomenon at the level of the prick point B of which the relative excess pressure will reduce the bubbling of the tube 24 and will promote the flowrate of air in the same sense, in the ball tube. It will be noted that this bubbling may easily be regulated by regulating the different leak flowrates. One may also consider the nature of the bubbling liquid as well as on that of the pressurized supply gas of the device.

Figure 4:
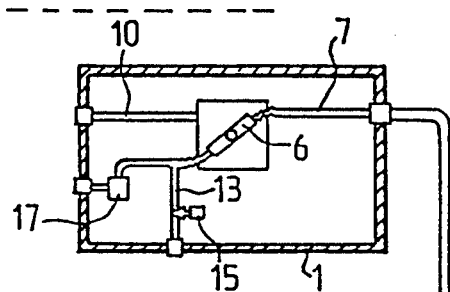
FIG. 4, a schematic view of another measurement interface.
Figure 4:
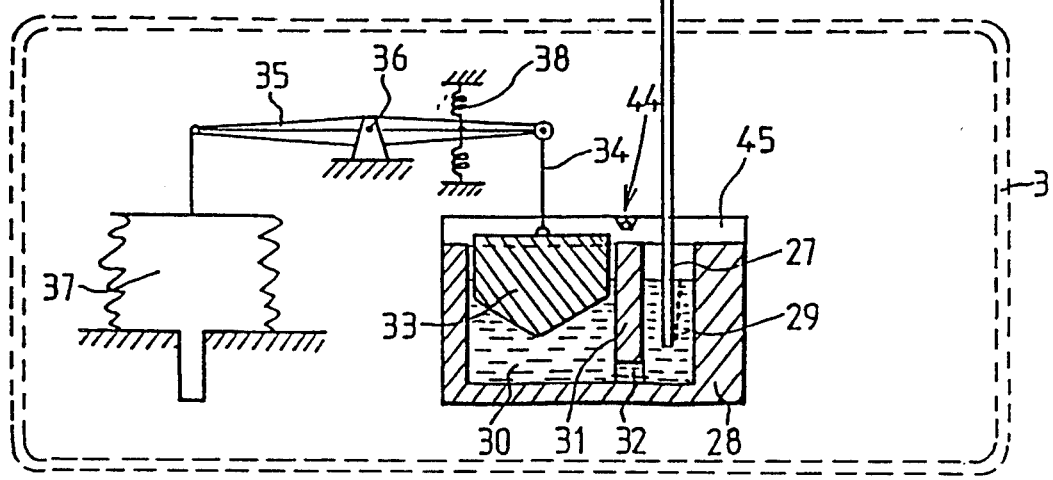

An interface device between the converter module 1 and a pressure or depression connection may be made as shown in FIG. 4. There will be found therein the module 1 of FIG. 3 but the leak flowrate of conduit 13 is, in this case, controlled by the needle valve tap 15.

The leak conduit 7, in that case, is connected to a capillary 27 which is immersed in a compartment 29 of a vat 28 of larger dimensions filled with liquid. The second compartment 30 of the vat is separated from the first by a partition 31 provided, however, with an orifice 32 for passage. The two compartments (29, 30) therefore act like communicating vessels. The vat 28 is closed by a cover 45 provided with an orifice 44 for communication with the free air, allowing decompression in the tight chamber of the vat. A sectioned piston 33, smaller in dimensions than the compartment 30, may move in the compartment under the action of a rod 34 itself associated with the movement of a balance arm 35 pivoting on a support pin 36.

The other end of the balance arms is servo-controlled by the displacement of bellows 37 for measuring pressure or depression. Finally, small balancing springs 38 tend to return the balance arms into position of equilibrium and are adjustable for calibration of the converter.

It functions as follows:

The leak flowrate 15 being adjusted in usual manner and the ball in equilibrium, a bubbling is effected in the chamber 29 at the base of the capillary 27. If a low or an excess pressure is exerted to compress or dilate the bellows 37, the balance arm 35 will move downwardly or upwardly against the springs 38 and cause the piston 33 to emerge or penetrate more or less in the compartment 30, under the action of the rod 34. This movement will bring about, in one direction or in the other, a displacement of liquid between chambers 29 and 30 and a corresponding modification of the level in chamber 29. Bubbling of the capillary is consequently modified, and the resultant variation in pressure is immediately translated by the displacement of the ball in the tube, displacement converted into signals detected by the opto-electronic system as in the preceding application.

The device described may, in a variant, also be used for measurement in depression.

Figure 5:
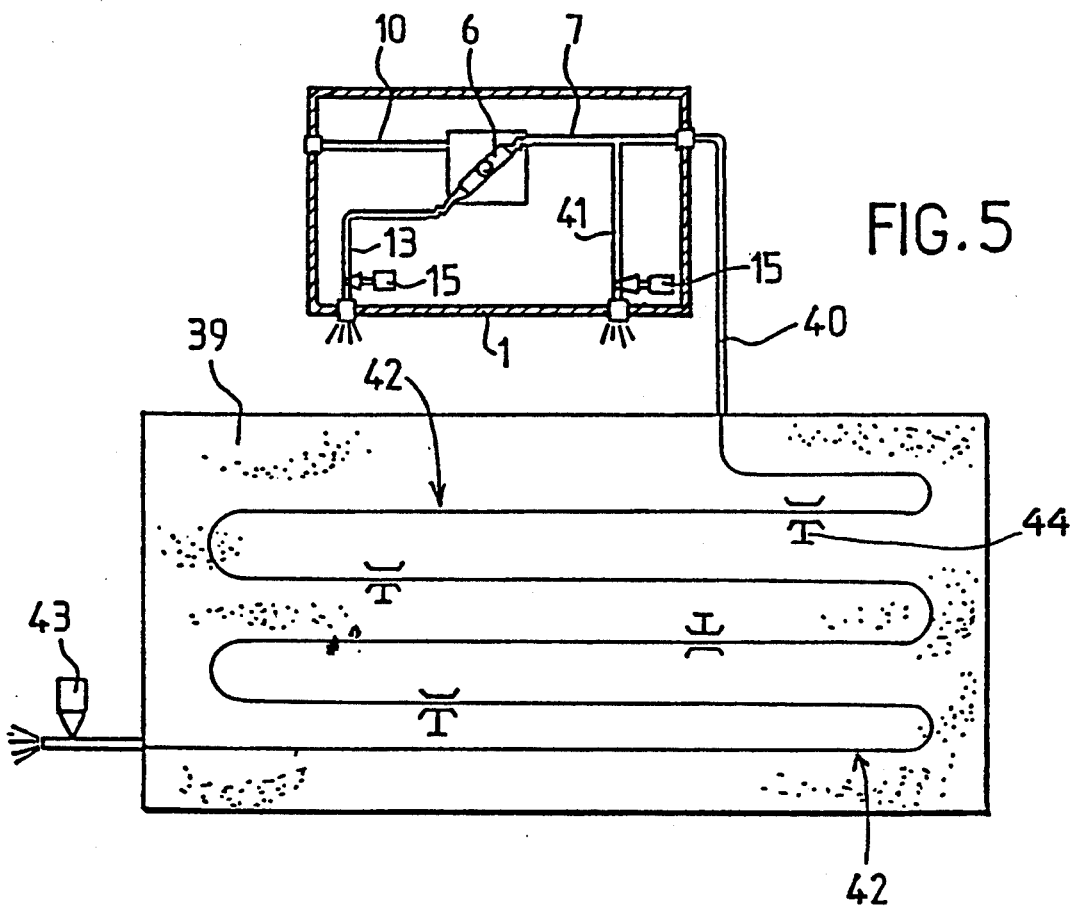
FIG. 5, a schematic view of an application of measurement in depression to a sensitive floor.

FIG. 5 shows a transmission module functioning in this manner and adapted to an application particular to a detection floor, called sensitive floor.

In the module 1 shown, the tube 6 and the detector layer of optical fibers 10 are used again. In this case, the conduit extending the tube terminates in an adjustable leak conduit 13 equipped with a needle valve tap 15. On the other side, supply conduit 7 is connected upstream of tube 6 to a sensitive floor 39 by a conduit 40 on which is provided another conduit 41 with leak flowrate adjustable by a needle valve tap or the like 15.

The floor 39 has a coil 42 passing therethrough, connected on One side to conduit 40 and on another side to an adjustable depression connection 43.

The floor is constituted by two layers of supple or rigid material which sandwiched therebetween the supple tube 42 in the form of a coil which has an elastic consistency. The latter is secured with a plurality of clamps 44.

When said floor is under surveillance and the ball has been previously adjusted with the aid of the leak flowrates (13, 41) to depression, as soon as a person places his foot on the floor 39, the positive or negative air micro-wave generated causes the ball to change position. As in the other examples, the associated optical device detects this movement and will trigger an alarm (not shown) with transmission of the signal in all or nothing mode either analog or digital form. If a person remains immobile on the floor or if a static object remains there, the clamps 44 stop or reduce the depression which, no longer being exerted on the ball, causes the latter to drop under the effect of its own weight, towards the lower part of the tube. This non-balanced position is also interpreted as an abnormality which triggers off an alarm that an analog measurement device may discriminate from the preceding one. In a simplified version (not shown), the tube 6 is directly connected to the conduit 40 without adjusting the leak flowrate at this level.

Because of the device described previously, a transmitter of micropressure, or of microdepression of high sensitivity is available, furnishing an analog or digital signal transmitted by optical fibers and therefore without limitation of distance. This gives the device a multitude of applications, due also to its low consumption of air and the possibility of using it in isolated places or ones remote from any source of electrical energy, as well as in a dangerous atmosphere. Thus, any variation of micro flowrate or micropressure of air is detected and measured. By way of example, the measurement of respiratory flowrates in functional exploration may be cited here or for the detection of respiration, or the measurement of mechanical movements of the heart.

It will also be noted that the leak flowrates previously mentioned may be directly regulated by a conventional pneumatic transmitter to generate the displacement of the ball in the glass tube.

I claim:

1. A device for detecting and transmitting a variation in air pressure or depression, for emission of an analog or digital signal, comprising a detector tube containing a displaceable ball, a signal representing the movement of said displaceable ball being detected and transmitted by a detection unit, the pressure in said tube varying as a function of the pressure and/or depression to be monitored, wherein said detector tube is an air micro-wave tube supplied with air at an adjustable pressure which is balanced by at least two adjustable air leaks, at least one on a conduit upstream of said tube and the other on a conduit downstream, to adjust position of said ball in said tube, and wherein a complementary means for adjusting position of said ball is obtained by a manual inclination of said tube between an extreme vertical position and a position slightly inclined with respect to a horizontal axis.

2. A device according to claim 1, wherein said tube is integrated in a box constituting a module for converting micro pressures and micro air flowrates into analog or digital output transmitted by optical fibers, and wherein a source of air pressure is admitted to said box, wherein said box includes a precision regulator flowmeter.

3. A device according to claim 1, wherein said tube is mounted on a plate able to rotate about said horizontal axis, making it possible to maneuver said detector tube manually to give it a desired inclination.

4. A device according to claim 1, wherein flowrates and pressure adjustments of said adjustable air leaks are obtained with needle valve taps or calculated orifices.

5. A device according to claim 1, wherein flowrates adjustments of said adjustable air leaks are obtained with bubbling tubes immersed in a liquid, a variation in height of said liquid affecting pressure in said bubbling tubes and modifying the leak flowrates.

6. A device according to claim 1, wherein said tube presents a section slightly conical from bottom to top, to obtain a more extensive scale of measurement than with a cylindrical tube.

7. A device according to claim 1, wherein said tube is integrated in a box constituting a module converting a modulated pneumatic signal of 3 to 15 PSI into a modulated micro signal, and able to emit an analog or digital signal transmitted by optical fibers.

8. A device according to claim 7, further comprising a complementary adjustable air leak conduit upstream of said tube, which is equipped with a needle valve tap.

9. A device according to claim 7 for detecting a pressure difference between a first prick point A and a second prick point B, wherein said first prick point A is connected to a first compartment having a closed head, a first U-tube connecting said first compartment with a second compartment partially filled with a first liquid, said second compartment being placed in communication with free air via an orifice, a first bubbling tube being immersed in said first liquid and connecting said second compartment to a first air leak conduit of said module, wherein said second prick point B is connected to a third compartment having a closed head, a second U-tube connecting said third compartment with a fourth compartment partially filled with a second liquid, said fourth compartment being placed in communication with free air via an orifice, a second bubbling tube being immersed in said second liquid and connecting said fourth compartment to a second air leak conduit of said module.

10. A device according to claim 9, wherein leak flowrate regulation is effected by variation in height of the liquid in said U-tubes, which affect pressures at orifices of said bubbling tubes and modifies the leak flowrates.

11. A device according to claim 7, wherein an interface between the pressure to be measured and said module is obtained with a piston moving in a liquid in a vat which is servo-controlled by movement of a bellows for measuring pressure or depression, the displacement of the piston modifying a level of liquid in a compartment in which is immersed a capillary performing the role of a bubbling tube.

12. A device according to claim 11, wherein said vat comprises two compartments separated by a partition, but communicating via a passage, said piston moving with small clearance in one of said compartments.

13. A device according to claim 11, wherein a balance arm returned by springs ensures transmission of movement of said bellows to said piston.

14. A device according to claim 7 for measurement of a depression produced in a supple tube, wherein one side of said supple tube is connected to said module by a conduit, wherein another side of said supple tube is connected to an adjustable depression connection.

15. A device according to claim 14, wherein said supple tube is integrated in a sensitive floor between two layers of rigid material, and wherein clamps fixed to said supple tube reduce a depression when a static weight rests on said floor.

* * * * *